(12) United States Patent
Koetting et al.

(10) Patent No.: US 8,486,552 B2
(45) Date of Patent: Jul. 16, 2013

(54) BATTERY MODULE HAVING COOLING MANIFOLD WITH PORTED SCREWS AND METHOD FOR COOLING THE BATTERY MODULE

(75) Inventors: William Koetting, Davisburg, MI (US); Josh Payne, Royal Oak, MI (US); Kwok Tom, Madison Heights, MI (US)

(73) Assignee: LG Chem, Ltd., Seoul (KR)

( * ) Notice: Subject to any disclaimer, the term of this patent is extended or adjusted under 35 U.S.C. 154(b) by 268 days.

(21) Appl. No.: 12/258,696

(22) Filed: Oct. 27, 2008

(65) Prior Publication Data

US 2009/0325055 A1    Dec. 31, 2009

Related U.S. Application Data

(63) Continuation-in-part of application No. 12/164,627, filed on Jun. 30, 2008.

(51) Int. Cl.
  *H01M 10/04* (2006.01)
  *H01M 2/02* (2006.01)

(52) U.S. Cl.
  USPC ........... 429/120; 429/149; 429/151; 429/156; 429/158; 429/159; 429/160

(58) Field of Classification Search
  None
  See application file for complete search history.

(56) References Cited

U.S. PATENT DOCUMENTS

| | | |
|---|---|---|
| 2,273,244 A | 2/1942 | Ambruster |
| 2,391,859 A | 1/1946 | Babcock |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,063,590 A | 12/1977 | McConnell |
| 4,298,904 A | 11/1981 | Koenig |
| 4,322,776 A | 3/1982 | Job et al. |
| 4,396,689 A | 8/1983 | Grimes et al. |
| 4,518,663 A * | 5/1985 | Kodali et al. ............. 429/18 |
| 4,646,202 A | 2/1987 | Hook et al. |
| 4,701,829 A | 10/1987 | Bricaud et al. |
| 4,777,561 A | 10/1988 | Murphy et al. |

(Continued)

FOREIGN PATENT DOCUMENTS

| | | |
|---|---|---|
| CN | 1512518 A | 7/2004 |
| EP | 0736226 B1 | 3/1999 |

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner* — Ula C. Ruddock
*Assistant Examiner* — Alix Echelmeyer
(74) *Attorney, Agent, or Firm* — Buckert Patent & Trademark Law Firm, P.C.

(57) ABSTRACT

A battery module having a cooling manifold is provided. The battery module includes a plurality of battery cell assemblies having a plurality of heat exchangers. The battery module further includes a first cooling manifold having a first inlet aperture extending therethrough and a first plurality of outlet apertures extending therethrough. The battery module further includes a first plurality of ported screws disposed through the first plurality of outlet apertures and configured to fluidly and physically couple the plurality of heat exchangers to the first cooling manifold.

11 Claims, 4 Drawing Sheets

U.S. PATENT DOCUMENTS

| | | | |
|---|---|---|---|
| 4,995,240 A | 2/1991 | Barthel et al. | |
| 5,057,968 A | 10/1991 | Morrison | |
| 5,071,652 A | 12/1991 | Jones et al. | |
| 5,214,564 A | 5/1993 | Metzler et al. | |
| 5,270,131 A | 12/1993 | Diethelm et al. | |
| 5,322,745 A | 6/1994 | Yanagihara et al. | |
| 5,346,786 A | 9/1994 | Hodgetts | |
| 5,354,630 A | 10/1994 | Earl et al. | |
| 5,356,735 A | 10/1994 | Meadows et al. | |
| 5,364,711 A | 11/1994 | Yamada et al. | |
| 5,385,793 A | 1/1995 | Tiedemann et al. | |
| 5,487,955 A | 1/1996 | Korall et al. | |
| 5,487,958 A | 1/1996 | Tura | |
| 5,510,203 A | 4/1996 | Hamada et al. | |
| 5,520,976 A | 5/1996 | Giannetti et al. | |
| 5,561,005 A | 10/1996 | Omaru et al. | |
| 5,589,290 A | 12/1996 | Klink et al. | |
| 5,663,007 A | 9/1997 | Ikoma et al. | |
| 5,693,432 A | 12/1997 | Matsumoto | |
| 5,756,227 A * | 5/1998 | Suzuki et al. | 429/62 |
| 5,937,664 A | 8/1999 | Matsuno et al. | |
| 6,087,036 A | 7/2000 | Rouillard et al. | |
| 6,099,986 A | 8/2000 | Gauthier et al. | |
| 6,111,387 A | 8/2000 | Kouzu et al. | |
| 6,117,584 A | 9/2000 | Hoffman et al. | |
| 6,121,752 A | 9/2000 | Kitahara et al. | |
| 6,176,095 B1 | 1/2001 | Porter | |
| 6,257,328 B1 | 7/2001 | Fujiwara et al. | |
| 6,399,238 B1 | 6/2002 | Oweis et al. | |
| 6,406,812 B1 | 6/2002 | Dreulle et al. | |
| 6,413,678 B1 | 7/2002 | Hamamoto et al. | |
| 6,422,027 B1 | 7/2002 | Coates, Jr. et al. | |
| 6,448,741 B1 | 9/2002 | Inui et al. | |
| 6,462,949 B1 | 10/2002 | Parish, IV et al. | |
| 6,475,659 B1 | 11/2002 | Heimer | |
| 6,512,347 B1 | 1/2003 | Hellmann et al. | |
| 6,569,556 B2 | 5/2003 | Zhou et al. | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,709,783 B2 | 3/2004 | Ogata et al. | |
| 6,750,630 B2 | 6/2004 | Inoue et al. | |
| 6,771,502 B2 | 8/2004 | Getz, Jr. et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 | 12/2004 | Bhatti et al. | |
| 6,878,485 B2 | 4/2005 | Ovshinsky et al. | |
| 6,886,249 B2 | 5/2005 | Smalc | |
| 6,982,131 B1 | 1/2006 | Hamada et al. | |
| 7,026,073 B2 | 4/2006 | Ueda et al. | |
| 7,070,874 B2 | 7/2006 | Blanchet et al. | |
| 7,147,045 B2 | 12/2006 | Quisenberry et al. | |
| 7,150,935 B2 | 12/2006 | Hamada et al. | |
| 7,229,327 B2 | 6/2007 | Zhao et al. | |
| 7,251,889 B2 | 8/2007 | Kroliczek et al. | |
| 7,264,902 B2 | 9/2007 | Horie et al. | |
| 7,467,525 B1 | 12/2008 | Ohta et al. | |
| 7,479,758 B2 | 1/2009 | Moon | |
| 7,531,270 B2 | 5/2009 | Buck et al. | |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,846,573 B2 | 12/2010 | Kelly | |
| 7,879,480 B2 | 2/2011 | Yoon et al. | |
| 7,883,793 B2 | 2/2011 | Niedzwiecki et al. | |
| 7,997,367 B2 | 8/2011 | Nakamura | |
| 8,007,915 B2 | 8/2011 | Kurachi | |
| 8,030,886 B2 | 10/2011 | Mahalingam et al. | |
| 8,067,111 B2 | 11/2011 | Koetting et al. | |
| 2001/0046624 A1 | 11/2001 | Goto et al. | |
| 2003/0082440 A1 | 5/2003 | Mrotek et al. | |
| 2004/0021442 A1 | 2/2004 | Higashino | |
| 2005/0026014 A1 | 2/2005 | Fogaing et al. | |
| 2005/0089750 A1 | 4/2005 | Ng et al. | |
| 2005/0110460 A1 | 5/2005 | Arai et al. | |
| 2005/0134038 A1 * | 6/2005 | Walsh | 285/125.1 |
| 2006/0231081 A1 * | 10/2006 | Kirakosyan | 123/590 |
| 2006/0234119 A1 | 10/2006 | Kruger et al. | |
| 2006/0286450 A1 | 12/2006 | Yoon et al. | |
| 2007/0037051 A1 | 2/2007 | Kim et al. | |
| 2007/0087266 A1 | 4/2007 | Bourke et al. | |
| 2007/0126396 A1 | 6/2007 | Yang | |
| 2008/0003491 A1 | 1/2008 | Yahnker et al. | |
| 2008/0041079 A1 | 2/2008 | Nishijima et al. | |
| 2008/0182151 A1 | 7/2008 | Mizusaki et al. | |
| 2008/0248338 A1 | 10/2008 | Yano et al. | |
| 2009/0087727 A1 | 4/2009 | Harada et al. | |
| 2009/0104512 A1 | 4/2009 | Fassnacht et al. | |
| 2009/0155680 A1 * | 6/2009 | Maguire et al. | 429/158 |
| 2009/0186265 A1 | 7/2009 | Koetting et al. | |
| 2009/0280395 A1 | 11/2009 | Nemesh et al. | |
| 2009/0325051 A1 | 12/2009 | Niedzwiecki et al. | |
| 2009/0325052 A1 | 12/2009 | Koetting et al. | |
| 2009/0325054 A1 | 12/2009 | Payne et al. | |
| 2009/0325055 A1 | 12/2009 | Koetting et al. | |
| 2010/0086842 A1 | 4/2010 | Yang | |
| 2010/0112419 A1 | 5/2010 | Jang et al. | |
| 2010/0203376 A1 | 8/2010 | Choi et al. | |
| 2010/0209760 A1 | 8/2010 | Yoshihara et al. | |
| 2010/0262791 A1 | 10/2010 | Gilton | |
| 2011/0041525 A1 | 2/2011 | Kim et al. | |

FOREIGN PATENT DOCUMENTS

| | | |
|---|---|---|
| EP | 0673553 B1 | 2/2001 |
| EP | 1435675 A1 | 7/2004 |
| EP | 1577966 A2 | 9/2005 |
| EP | 1852925 A1 | 11/2007 |
| JP | 4056079 A | 2/1992 |
| JP | 08-111244 A | 4/1996 |
| JP | 8138735 A | 5/1996 |
| JP | 8222280 A | 8/1996 |
| JP | 9129213 A | 5/1997 |
| JP | 09-219213 | 8/1997 |
| JP | 10199510 A | 7/1998 |
| JP | 11066949 A | 3/1999 |
| JP | 11191432 A | 7/1999 |
| JP | 2001-105843 A | 4/2001 |
| JP | 2002-038033 A | 2/2002 |
| JP | 2002-319383 A | 10/2002 |
| JP | 2003-188323 A | 7/2003 |
| JP | 2003219572 A | 7/2003 |
| JP | 2005-126315 | 5/2005 |
| JP | 2005-349955 A | 12/2005 |
| JP | 2006-139928 A | 6/2006 |
| JP | 2008-054379 A | 3/2008 |
| JP | 2008-062875 A | 3/2008 |
| JP | 2008-080995 | 4/2008 |
| JP | 2008-159440 A | 7/2008 |
| JP | 2009-009889 A | 1/2009 |
| KR | 10-2008-0047641 A | 5/2008 |
| KR | 100921346 B1 | 10/2009 |
| WO | WO03/071616 A2 | 8/2003 |
| WO | 2006/101343 A1 | 9/2006 |
| WO | 2007/007503 A1 | 1/2007 |
| WO | 2007/115743 A2 | 10/2007 |
| WO | 2009/073225 A1 | 6/2009 |

OTHER PUBLICATIONS

European Supplementary Search Report dated Aug. 28, 2009 for EP Application No. 04774658.

International Search Report for International application No. PCT/KR2005/003755 dated Mar. 2, 2006.

International Search Report for PCT/KR2009/000258 dated Aug. 28, 2009.

International Search report for PCT/KR2009/003434 dated Jan. 18, 2010.

Machine translation of JP 08-138735.

Machine translation of JP 10-199510.

Machine translation of JP 2000 260469.

William Koetting et al., pending U.S. Appl. No. 12/897,135 entitled "Battery Cell Assembly, Heat Exchanger, and Method for Manufacturing the Heat Exchanger," filed with the U.S. Patent and Trademark Office on Oct. 4, 2010.

Thomas J. Gadawski et al., pending U.S. Appl. No. 13/433,649 entitled "Battery System and Method for Cooling the Battery System," filed with the U.S. Patent and Trademark Office on Mar. 29, 2012.

International Search Report; International Application No. PCT/KR2009/003428, International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2009/006121; International Filing Date: Oct. 22, 2009; Date of Mailing: May 3, 2010; 2 pages.

International Search Report; International Application No. PCT/KR2010/002334; Internatinoal Filing Date: Apr. 15, 2010; Date of Mailing: Nov. 29, 2010; 2 pages.

International Search Report for International application No. PCT/KR2010/002336 dated Jan. 31, 2011.

International Search report for International application No. PCT/KR2010/002337 dated Jan. 31, 2011.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

Machine Translation of Japanese Patent Application No. 2009-009889 A, published Jan. 15, 2009, 22 pages.

* cited by examiner

US 8,486,552 B2

BATTERY MODULE HAVING COOLING MANIFOLD WITH PORTED SCREWS AND METHOD FOR COOLING THE BATTERY MODULE

CROSS REFERENCE TO RELATED APPLICATIONS

This application is a continuation-in-part of pending U.S. patent application Ser. No. 12/164,627, filed Jun. 30, 2008, the contents of which are incorporated herein by reference in its entirety.

TECHNICAL FIELD

This application relates generally to a battery module having a cooling manifold with ported screws and a method for cooling the battery module.

BACKGROUND OF THE INVENTION

Battery packs generate heat during usage. To prevent degradation of the battery packs, the battery packs should be cooled. However, an existing cooling system may not uniformly cool battery cells in a battery pack. The inventors herein have recognized that if battery cells in a battery pack are not uniformly cooled, the battery cells can undesirably have differing operational characteristics including differing output voltages.

Accordingly, the inventors herein have recognized a need for a battery module having a cooling manifold that eliminates and/or reduces the above mentioned deficiency

SUMMARY OF THE INVENTION

A battery module in accordance with an exemplary embodiment is provided. The battery module includes a plurality of battery cell assemblies having a plurality of heat exchangers. The battery module further includes a first cooling manifold having a first inlet aperture extending therethrough and a first plurality of outlet apertures extending therethrough. The battery module further includes a first plurality of ported screws disposed through the first plurality of outlet apertures and configured to fluidly and physically couple the plurality of heat exchangers to the first cooling manifold.

A method for cooling a battery module in accordance with another exemplary embodiment is provided. The battery module has a plurality of battery cell assemblies and a first cooling manifold. The plurality of battery cell assemblies has a plurality of heat exchangers. The method includes routing fluid through a first inlet aperture of the first cooling manifold into the first cooling manifold. The first cooling manifold further includes a first plurality of outlet apertures extending therethrough. The method further includes routing the fluid through a first plurality of ported screws disposed through the first plurality of outlet apertures to the plurality of heat exchangers of the battery cell assemblies to cool the plurality of battery cell assemblies.

BRIEF DESCRIPTION OF THE DRAWINGS

FIG. 3 is an exploded schematic of a battery cell assembly utilized in the battery module of FIG. 2;

DETAILED DESCRIPTION OF AN EXEMPLARY EMBODIMENT

Figure 1:
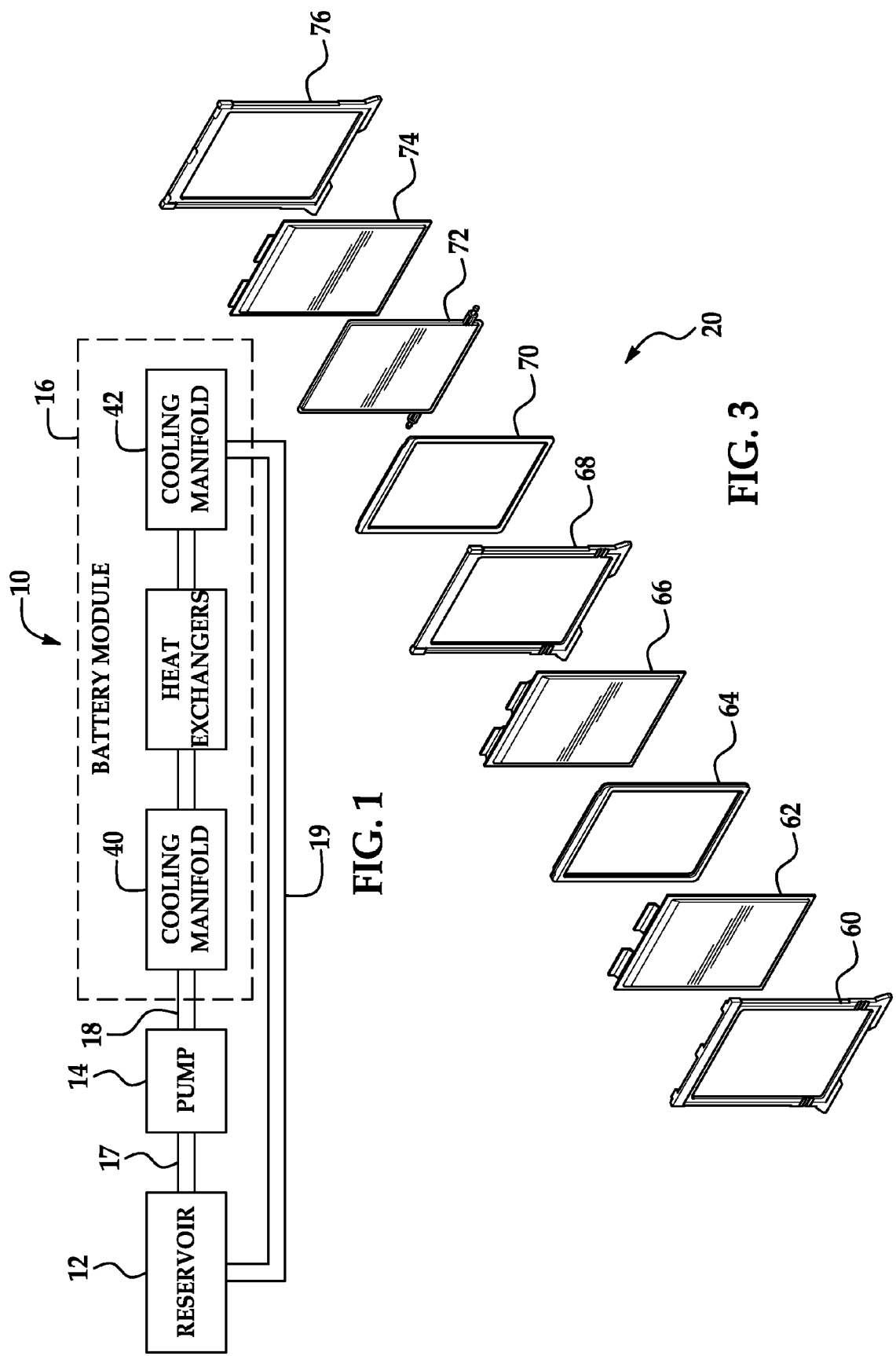
FIG. 1 is a schematic of a system for cooling a battery module in accordance with an exemplary embodiment.

Referring to FIG. 1, a system 10 for cooling a battery module 16 is illustrated. The system 10 includes a reservoir 12, a pump 14, and conduits 17, 18 and 19. The reservoir 12 holds a fluid therein. The pump 14 pumps the fluid from the reservoir 12 via the conduit 17. Thereafter, the pump 14 pumps the fluid into the battery module 16 via the conduit 18. The battery module 16 includes a cooling manifold 40, heat exchangers, and a cooling manifold 42 that will be explained in greater detail below. The cooling manifold 40 is configured to provide a substantially equal flow rate of the fluid through each ported screw fluidly coupled to each of the respective heat exchangers in the battery module 16 such that the battery cells therein have a substantially equal amount of heat energy removed from the battery cells. Thus, all of the battery cells in the battery module 16 are maintained at a substantially similar temperature resulting in the battery cells having uniform operational characteristics including output voltages. The cooling manifold 42 receives the heated fluid from the heat exchangers in the battery module 16 through ported screws fluidly coupled to the heat exchangers, and routes the heated fluid through the conduit 19 back to the reservoir 12. A battery cell assembly is defined as a housing having a battery cell therein. A battery module is defined as at least two battery cell assemblies physically or electrically coupled together.

Figure 2:
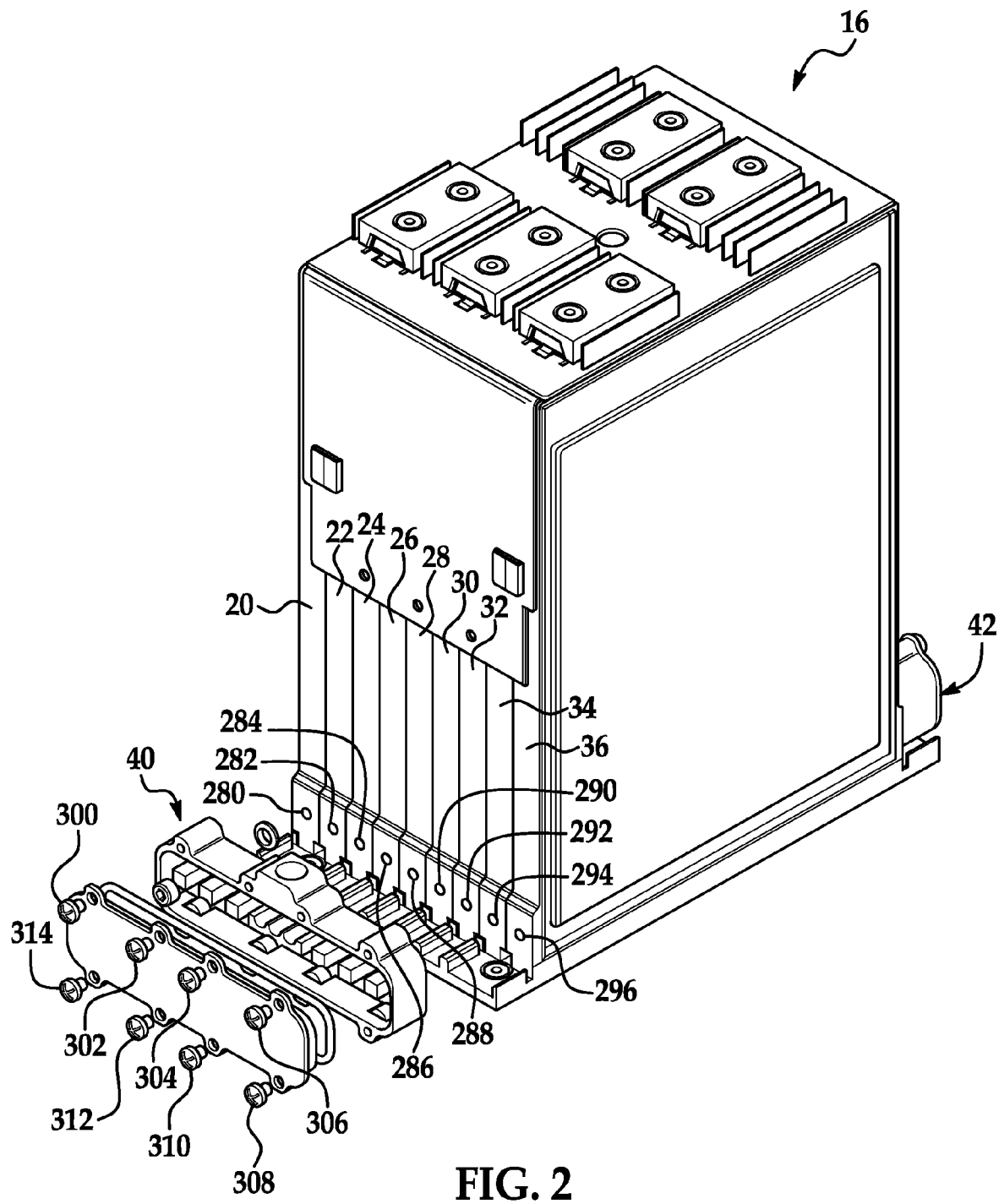
FIG. 2 is a schematic of a battery module in accordance with another exemplary embodiment.

Referring to FIG. 2, the battery module 16 includes battery cell assemblies 20, 22, 24, 26, 28, 30, 32, 34 and 36 and cooling manifolds 40 and 42. Because the battery cell assemblies 20, 22, 24, 26, 28, 30, 32, 34 and 36 have a substantially similar configuration, only the battery cell assembly 20 will be described in greater detail below. Referring to FIG. 3, the battery cell assembly 20 includes a frame member 60, a battery cell 62, a securement member 64, a battery cell 66, a frame member 68, a securement member 70, a heat exchanger 72, a battery cell 74, and a frame member 76. The frame members 60 and 68 are provided to support the battery cell 62, the securement member 64, and the battery cell 66 therebetween. The frame members 68 and 76 are provided to support the securement member 70, the heat exchanger 72, and the battery cell 74 therebetween. In one exemplary embodiment, the battery cells 62, 66, 74 are lithium-ion battery cells. During operation, the cooling manifold provides a predetermined flow rate of fluid through the heat exchanger 72 such that heat energy is removed from the battery cells 62, 66 and 74 that are thermally coupled to the heat exchanger 72 such that the battery cells 62, 66 and 74 are maintained at a substantially similar temperature.

Figure 4:
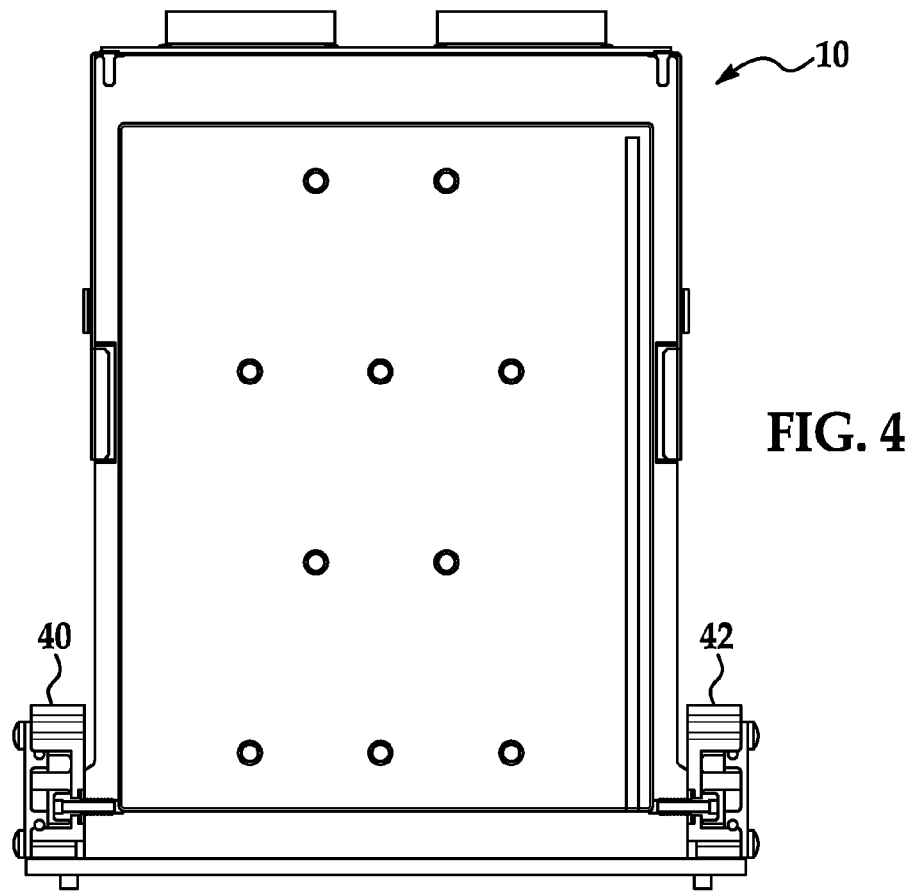
FIG. 4 is a sectional schematic of the battery module of FIG. 2.
Figure 5:
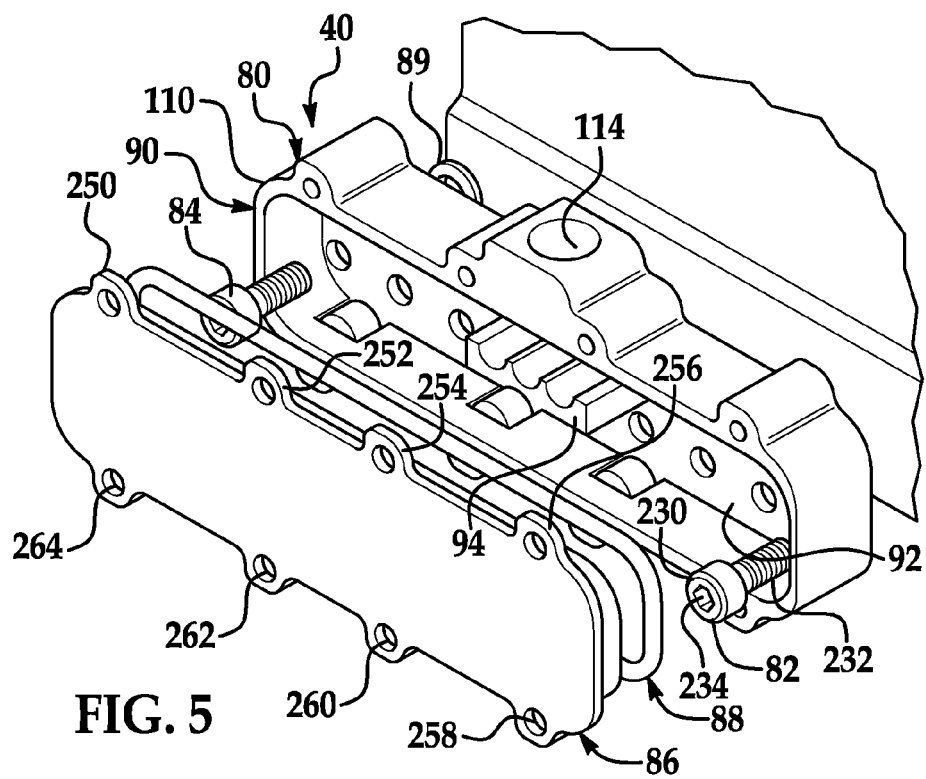
FIG. 5 is an exploded schematic of a cooling manifold utilized in the battery module of FIG. 2.

Referring to FIGS. 4 and 5, a structure of the cooling manifold 40 will now be explained. The cooling manifold 40 includes a manifold portion 80, a plurality of ported screws such as ported screws 82, 84, a cover plate 86, a gasket 88, and a plurality of o-rings such as o-ring 89.

The manifold portion 80 includes a peripheral wall 90, a rear wall 92 coupled to the peripheral wall 90, and a flow diverter 94 coupled to the rear wall 92. In one exemplary embodiment, the manifold portion 80 is constructed from plastic. Of course, in alternative embodiments, the manifold portion 80 could be constructed from other materials such as steel, ceramics, or metal alloys for example. The peripheral wall 90 includes a front end 110 and a rear end 112. Further, the peripheral wall 90 has a top portion with an aperture 114 extending therethrough. The aperture 114 receives fluid from the pump 14 (shown in FIG. 1). Still further, the peripheral wall 90 includes a plurality of threaded apertures 150, 152, 154, 156, 158, 160, 162, 164 extending into the front end 110 of the peripheral wall 90 for receiving mounting screws therein for coupling the cover plate 86 to the manifold portion 80.

Figure 6:
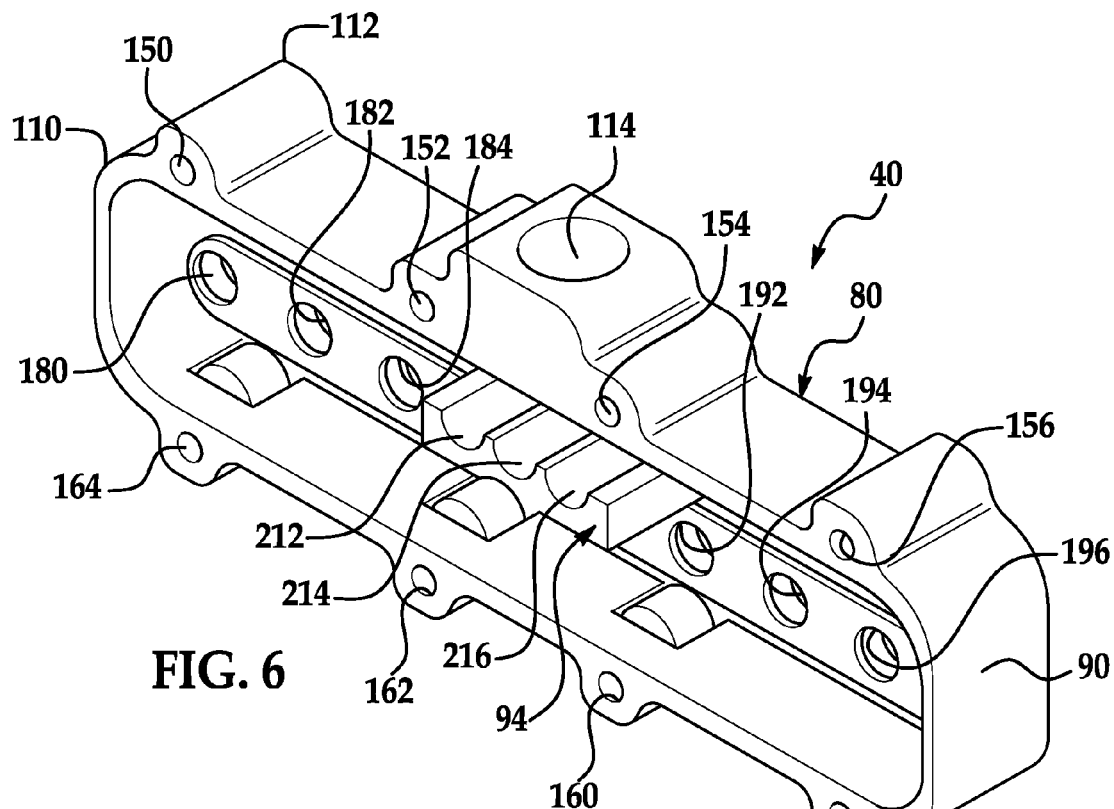
FIG. 6 is a schematic of a manifold portion of the cooling manifold of FIG. 5.
Figure 7:
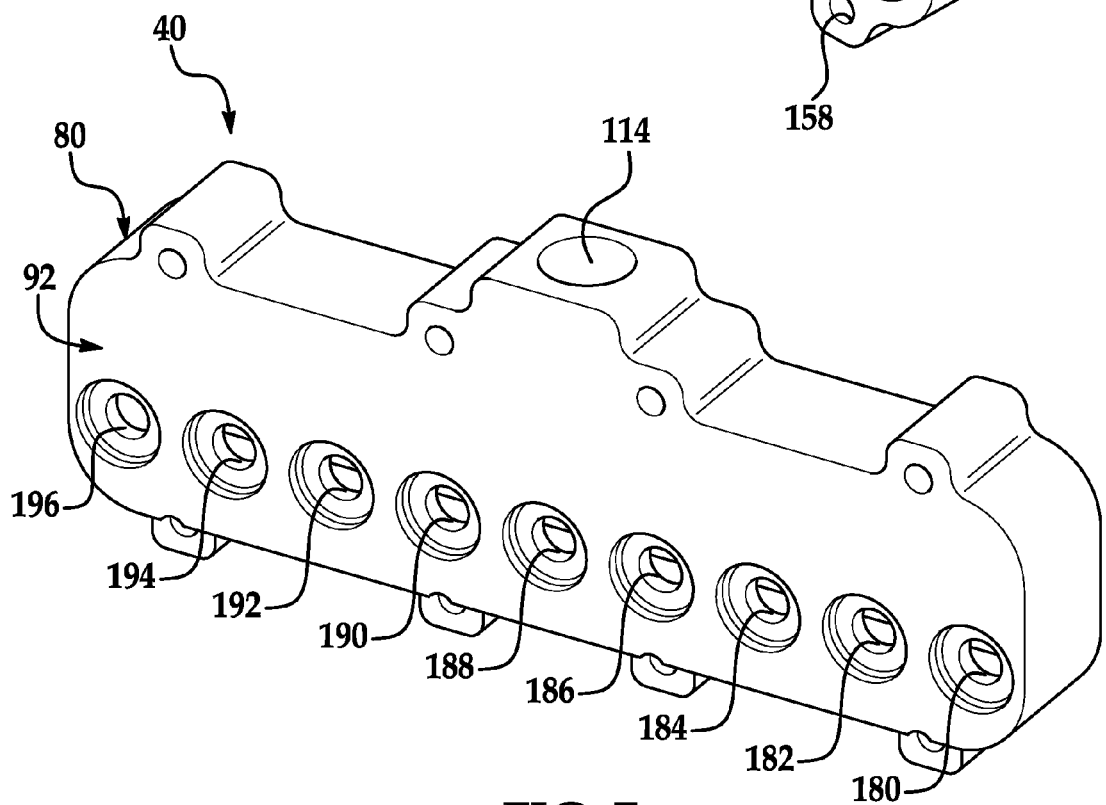
FIG. 7 is another schematic of the manifold portion of the cooling manifold of FIG. 5.

Referring to FIGS. 6 and 7, the rear wall 92 includes outlet apertures 180, 182, 184, 186, 188, 190, 192, 194 and 196 extending therethrough for receiving ported screws therethrough. The ported screws route fluid from an interior region of the cooling manifold 40 to the battery cell assemblies 20, 22, 24, 26, 28, 30, 32, 34 and 36, respectively. It should be noted that although only ported screws 82, 84 are shown, each of the apertures 180, 182, 184, 186, 188, 190, 192, 194 and 196, would have a corresponding ported screw extending therethrough. Referring to FIGS. 2, 6 and 7, the ported screws extend through the apertures 180, 182, 184, 186, 188, 190, 192, 194 and 196 are received in the apertures 280, 282, 284, 286, 288, 290, 292, 294, 296, respectively in the battery cell assemblies 20, 22, 24, 26, 28, 30, 32, 34, 36, respectively. The apertures 280, 282, 284, 286, 288, 290, 292, 294, 296 fluidly communicate with respective heat exchangers in the battery module 16. Because the ported screws have a substantially similar structure, only the structure of the ported screw 82 will be described. In particular, referring to FIG. 5, the ported screw 82 includes a head portion 230, a threaded portion 232, and an aperture 234 extending through both the headed portion 230 and the threaded portion 232. Thus, the ported screws allow fluid communication between an interior region of the cooling manifold 40 and the heat exchangers in the battery module 16. In one exemplary embodiment, the ported screws are constructed from steel. Of course, other materials for constructing the ported screws are contemplated.

Referring to FIG. 6, the flow diverter 94 is coupled to the rear wall 92 and extends from the rear wall 92 toward the front end 110 of the peripheral wall 90. The flow diverter 94 is disposed below the inlet aperture 114. The flow diverter 94 is configured to receive fluid from the inlet aperture 114 and to divert the fluid so that a substantially equal flow rate of the fluid is obtained through the outlet apertures 180, 182, 184, 186, 188, 190, 192, 194 and 196 to respective heat exchangers in the battery cell assemblies 20, 22, 24, 26, 28, 30, 32, 34 and 36, respectively, for uniformly cooling the battery cell assemblies. In one exemplary embodiment, the flow diverter 94 comprises a plate 210 with grooves 212, 214, 216 on a top surface thereof that are spaced apart from one another. The grooves 212, 214, 216 extend from an end of the plate 210 proximate to the rear wall 92 toward the cover plate 86. Further, in one exemplary embodiment, the flow diverter 94 is configured such that the flow rate of fluid that is obtained through each outlet aperture is within ±5% of a first flow rate.

Referring to FIG. 5, the cover plate 86 is coupled to the front end 110 of the peripheral wall 90. In one exemplary embodiment, the cover plate 86 is constructed from plastic. Of course, in alternative embodiments, the cover plate 86 could be constructed from other materials such as steel, ceramics, or metal alloys for example. In an exemplary embodiment, the cover plate 86 includes apertures 250, 252, 254, 256, 258, 260, 262, 264 extending therethrough. Bolts 300, 302, 304, 306, 308, 310, 312 and 314 extend through the apertures 250, 252, 254, 256, 258, 260, 262 and 264, respectively, of the cover plate 88 and the apertures 150, 152, 154, 156, 158, 160, 162 and 164, respectively of the manifold portion 80 to couple the cover plate 88 to the manifold portion 80.

Referring to FIGS. 1 and 2, the cooling manifold 42 has a substantially similar structure as the cooling manifold 40. The cooling manifold 42 receives the heated fluid from the heat exchangers in the battery cell assemblies of the battery module 16 and returns the heated fluid to the reservoir 12, via the conduit 19.

The battery module 10 and method for cooling the battery module provide a substantial advantage over other battery modules and methods. In particular, the battery module and method provide a technical effect of utilizing ported screws to fluidly and physically couple a cooling manifold to heat exchangers in the battery module for routing a fluid to the heat exchangers to cool the battery module.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:
1. A battery module, comprising:
a plurality of battery cell assemblies having a plurality of heat exchangers;
a first cooling manifold having a peripheral wall and a rear wall, the peripheral wall having a front end and a rear end, the rear wall being coupled to the rear end of the peripheral wall and enclosing the rear end of the peripheral wall, the peripheral wall and the rear wall defining an interior region, a first inlet aperture extends through a top portion of the peripheral wall, and a first plurality of outlet apertures extends through the rear wall such that a fluid flows through the first inlet aperture and then toward the first plurality of outlet apertures, a first plurality of circular-shaped grooves being formed in an outer side of the rear wall adjacent to the first plurality of outlet apertures;
a first plurality of o-rings disposed in the first plurality of circular-shaped grooves;
a first plurality of ported screws disposed through the first plurality of outlet apertures of the rear wall and configured to fluidly and physically couple the plurality of heat exchangers to the first cooling manifold, each ported screw of the first plurality of ported screws having a head portion coupled to a threaded portion with an internal aperture extending through both the head portion and the threaded portion, each respective head portion being disposed in the interior region, a direction of flow of the fluid through the first plurality of ported screws being substantially perpendicular to a direction of flow of the fluid through the first inlet aperture; and a cover plate configured to be coupled to the front end of the peripheral wall and encloses the front end of the peripheral wall.

2. The battery module of claim 1, further comprising:
a second cooling manifold having a first plurality of inlet apertures extending therethrough and a first outlet aperture extending therethrough; and
a second plurality of ported screws disposed through the first plurality of inlet apertures and configured to fluidly and physically couple the plurality of heat exchangers to the second cooling manifold.

3. The battery module of claim 1, wherein each screw of the first plurality of ported screws is constructed from steel.

4. The battery module of claim 1, wherein the first cooling manifold is constructed of plastic.

5. The battery module of claim 1, wherein each battery cell assembly has a battery cell.

6. The battery module of claim 1, wherein the substantially flat rear wall has a substantially flat outer surface for abutting against flat outer surfaces of the plurality of battery cell assemblies.

7. The battery module of claim 1, wherein the first end of the peripheral wall has a plurality of threaded apertures extending therein, and the cover plate has a plurality of apertures extending therethrough such that each aperture in the cover plate is disposed adjacent a respective aperture of the plurality of threaded apertures, and a plurality of bolts extend through the plurality of apertures in the cover plate and into the plurality of threaded apertures in the peripheral wall to couple the cover plate to the peripheral wall.

8. The battery module of claim 1, further comprising a gasket disposed between the peripheral wall and the cover plate.

9. A battery module, comprising:
a plurality of battery cell assemblies having a plurality of heat exchangers;
a first cooling manifold having a peripheral wall and a rear wall, the peripheral wall having a front end and a rear end, the rear wall being coupled to the rear end of the peripheral wall and enclosing the rear end of the peripheral wall, the peripheral wall and the rear wall defining an interior region, a first inlet aperture extends through a top portion of the peripheral wall, and a first plurality of outlet apertures extends through the rear wall;
a flow diverter having a first plate extending from the rear wall into the interior region, the flow diverter being disposed directly below the first inlet aperture and configured to receive fluid from the first inlet aperture and to divert the fluid within the interior region;
a first plurality of ported screws disposed through the first plurality of outlet apertures of the rear wall and disposed below the flow diverter and configured to fluidly and physically couple the plurality of heat exchangers to the first cooling manifold, each ported screw of the first plurality of ported screws having a head portion coupled to a threaded portion with an internal aperture extending through both the head portion and the threaded portion, each respective head portion being disposed in the interior region such that at least a portion of the fluid flows from the interior region through each internal aperture of each ported screw of the first plurality of ported screws to a respective heat exchanger of the plurality of heat exchangers, a direction of flow of the fluid through the first plurality of ported screws being substantially perpendicular to a direction of flow of the fluid through the first inlet aperture;
a cover plate configured to be coupled to the front end of the peripheral wall and encloses the front end of the peripheral wall; and
the first plate of the flow diverter being configured such that a flow rate of the fluid through each screw of the first plurality of ported screws to a respective heat exchanger of the plurality of heat exchangers is within ±5% of a first flow rate.

10. A method for cooling a battery module, the battery module having a plurality of battery cell assemblies and a first cooling manifold, the plurality of battery cell assemblies having a plurality of heat exchangers, the method comprising:
routing fluid through a first inlet aperture of a top portion of a peripheral wall of the first cooling manifold into an interior region of the first cooling manifold, the first cooling manifold further having a substantially flat rear wall coupled to the peripheral wall;
receiving the fluid at a flow diverter disposed below the first inlet aperture and diverting the fluid within the interior region utilizing the flow diverter, the flow diverter having a first plate extending from the substantially flat rear wall into the interior region, the flow diverter being disposed above a first plurality of outlet apertures extending through the substantially flat rear wall of the first cooling manifold, and a first plurality of ported screws disposed through the first plurality of output apertures, each ported screw of the first plurality of ported screws having a head portion and a threaded portion with an internal aperture extending through both the head portion and the threaded portion, each respective head portion being disposed in the interior region; and
routing the fluid from the interior region through the head portions of the first plurality of ported screws disposed in the interior region, and the threaded portions of the first plurality of ported screws disposed through the first plurality of outlet apertures of the substantially flat rear wall of the first cooling manifold to the plurality of heat exchangers of the battery cell assemblies coupled to the substantially flat wall to cool the plurality of battery cell assemblies, a direction of flow of the fluid through the first plurality of ported screws being substantially perpendicular to a direction of flow of the fluid through the first inlet aperture.

11. The method of claim 10, further comprising:
routing the fluid from the plurality of heat exchangers through a second plurality of ported screws disposed through a first plurality of inlet apertures of a second cooling manifold and into the second cooling manifold; and
routing the fluid through a first outlet port of the second cooling manifold.

* * * * *